(12) United States Patent
Momose et al.

(10) Patent No.: US 12,693,674 B2
(45) Date of Patent: Jul. 28, 2026

(54) REMOTE DRIVING SYSTEM, REMOTE DRIVING TERMINAL, AND METHOD FOR REMOTE DRIVING

(71) Applicant: TOYOTA JIDOSHA KABUSHIKI KAISHA, Toyota (JP)

(72) Inventors: Hirofumi Momose, Numazu (JP); Junji Kawamuro, Toyota (JP); Shuichi Tamagawa, Toyota (JP); Kosuke Akatsuka, Mishima (JP); Yuki Suehiro, Toyota (JP); Naofumi Kobayashi, Gotemba (JP); Rio Suda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 18/413,725

(22) Filed: Jan. 16, 2024

(65) Prior Publication Data

US 2024/0248480 A1 Jul. 25, 2024

(30) Foreign Application Priority Data

Jan. 25, 2023 (JP) ................................. 2023-009601

(51) Int. Cl.
*G05D 1/227* (2024.01)
*G05D 1/222* (2024.01)
(Continued)

(52) U.S. Cl.
CPC ............. *G05D 1/227* (2024.01); *G05D 1/222* (2024.01); *G05D 1/86* (2024.01); *G06V 20/52* (2022.01);
(Continued)

(58) Field of Classification Search
None
See application file for complete search history.

(56) References Cited

U.S. PATENT DOCUMENTS

| | | | |
|---|---|---|---|
| 11,215,982 B2 | 1/2022 | Urano et al. | |
| 11,325,618 B2 | 5/2022 | Umeda | |
| | (Continued) | | |

FOREIGN PATENT DOCUMENTS

| | | | |
|---|---|---|---|
| JP | 2021-018486 A | 2/2021 | |
| JP | 2021-144732 A | 9/2021 | |
| | (Continued) | | |

OTHER PUBLICATIONS

WO 2021160662 A1—Merged Original and Translation (Year: 2021).*

*Primary Examiner* — James J Lee
*Assistant Examiner* — Elizabeth Galyn Martinez
(74) *Attorney, Agent, or Firm* — Sughrue Mion, PLLC

(57) ABSTRACT

The present disclosure relates to a remote driving system that performs remote driving of a vehicle based on an operation amount input to a remote driving terminal. The remote driving system includes at least one processor. The at least one processor detects a second situation showing a sign of a first situation in which the remote driving of the vehicle is required. The at least one processor performs at least a part of an initial check for checking that the remote driving can be started at the remote driving terminal before the first situation is detected in a case where the second situation is detected. The at least one processor starts the remote driving in a case where the first situation is detected.

8 Claims, 11 Drawing Sheets

1: REMOTE DRIVING SYSTEM

(51) Int. Cl.
    *G05D 1/86*         (2024.01)
    *G05D 109/10*     (2024.01)
    *G06V 20/52*      (2022.01)

(52) U.S. Cl.
    CPC ..... *G05D 2109/10* (2024.01); *G06V 2201/08*
                       (2022.01)

(56)                   References Cited

U.S. PATENT DOCUMENTS

| | | |
|---|---|---|
| 2019/0137999 A1 | 5/2019 | Taguchi et al. |
| 2020/0209888 A1 | 7/2020 | Sakai et al. |
| 2020/0326702 A1 | 10/2020 | Iwamoto et al. |
| 2021/0016795 A1 | 1/2021 | Matsushita et al. |
| 2021/0041894 A1 | 2/2021 | Urano et al. |
| 2021/0055741 A1 | 2/2021 | Kawanai et al. |
| 2021/0058173 A1 | 2/2021 | Otaki et al. |
| 2021/0072743 A1 | 3/2021 | Otaki et al. |
| 2021/0080943 A1 | 3/2021 | Iwamoto et al. |
| 2022/0397898 A1 | 12/2022 | Urano et al. |

FOREIGN PATENT DOCUMENTS

| | | | |
|---|---|---|---|
| JP | 2022-188661 A | 12/2022 | |
| WO | WO-2021160662 A1 * | 8/2021 | .............. H04W 4/40 |

* cited by examiner

1: REMOTE DRIVING SYSTEM

200: REMOTE DRIVING TERMINAL

350

CONTROL DEVICE

360

PROCESSOR

370

MEMORY

PROGRAM

310

COMMUNICATION DEVICE

300: MANAGEMENT DEVICE

REMOTE DRIVING SYSTEM, REMOTE DRIVING TERMINAL, AND METHOD FOR REMOTE DRIVING

CROSS-REFERENCE TO RELATED APPLICATION

The present application claims priority under 35 U.S.C. § 119 to Japanese Patent Application No. 2023-009601, filed on Jan. 25, 2023, the contents of which application are incorporated herein by reference in their entirety.

BACKGROUND

Field

The present disclosure relates to a technique for performing remote driving of a vehicle.

Background Art

Patent Literature 1 discloses a vehicle control device. When a transition from one driving state to another driving state is scheduled, the vehicle control device performs notification of information relating to the transition of the driving state to an occupant and to other vehicles. The driving state includes manual driving, autonomous driving, and remote driving.

List of Related Art

Patent Literature 1: Japanese Laid-Open Patent Application No. JP-2021-018486

SUMMARY

A system for remotely driving a vehicle based on an operation amount input to a remote driving terminal by a remote operator is known. Such a system is sometimes referred to as a remote driving system. The remote driving system starts remote driving when a situation in which the vehicle requires the remote driving occurs. However, at this time, the remote driving system does not immediately start the remote driving. For starting the remote driving, the remote driving system first performs an initial check for checking that the remote driving can be started. The remote driving system starts the remote driving only after obtaining a good result of the initial check. Therefore, in order to smoothly start the remote driving, it is required to finish the initial check early.

An object of the present disclosure is to provide a technique for finishing an initial check early and starting remote driving smoothly in a remote driving system.

The first aspect of the present disclosure relates to a remote driving system that performs remote driving of a vehicle based on an operation amount input to a remote driving terminal. The remote driving system includes at least one processor. The at least one processor detects a second situation showing a sign of a first situation in which the remote driving of the vehicle is required. The at least one processor performs at least a part of an initial check for checking that the remote driving can be started at the remote driving terminal before the first situation is detected in a case where the second situation is detected. The at least one processor starts the remote driving in a case where the first situation is detected.

The second aspect of the present disclosure relates to a remote driving terminal that performs remote driving of a vehicle based on an operation amount input by a remote operator. The remote driving terminal includes at least one processor. The at least one processor acquires information indicating that a second situation showing a sign of a first situation in which the remote driving of the vehicle is required occurs. The at least one processor performs at least a part of an initial check for checking that the remote driving terminal can start the remote driving before the first situation occurs in a case where the second situation occurs. The at least one processor starts the remote driving in a case where the first situation occurs.

The third aspect of the present disclosure relates to a method for performing remote driving of a vehicle based on an operation amount input into a remote driving terminal. The method includes detecting a second situation showing a sign of a first situation in which the remote driving of the vehicle is required, performing at least a part of an initial check for checking that the remote driving can be started at the remote driving terminal before the first situation is detected in a case where the second situation is detected, and starting the remote driving in a case where the first situation is detected.

According to the present disclosure, a second situation showing a sign of a first situation in which remote driving of a vehicle is required is detected. When the second situation is detected, at least a part of an initial check is performed before the first situation occurs. By performing at least a part of the initial check in advance, it is possible to shorten the time from detecting the first situation to finishing the initial check and to smoothly start the remote driving.

DETAILED DESCRIPTION

Embodiments of the present disclosure will be described with reference to the accompanying drawings.

1. Remote Driving System

1-1. Configuration of System

Figure 1:
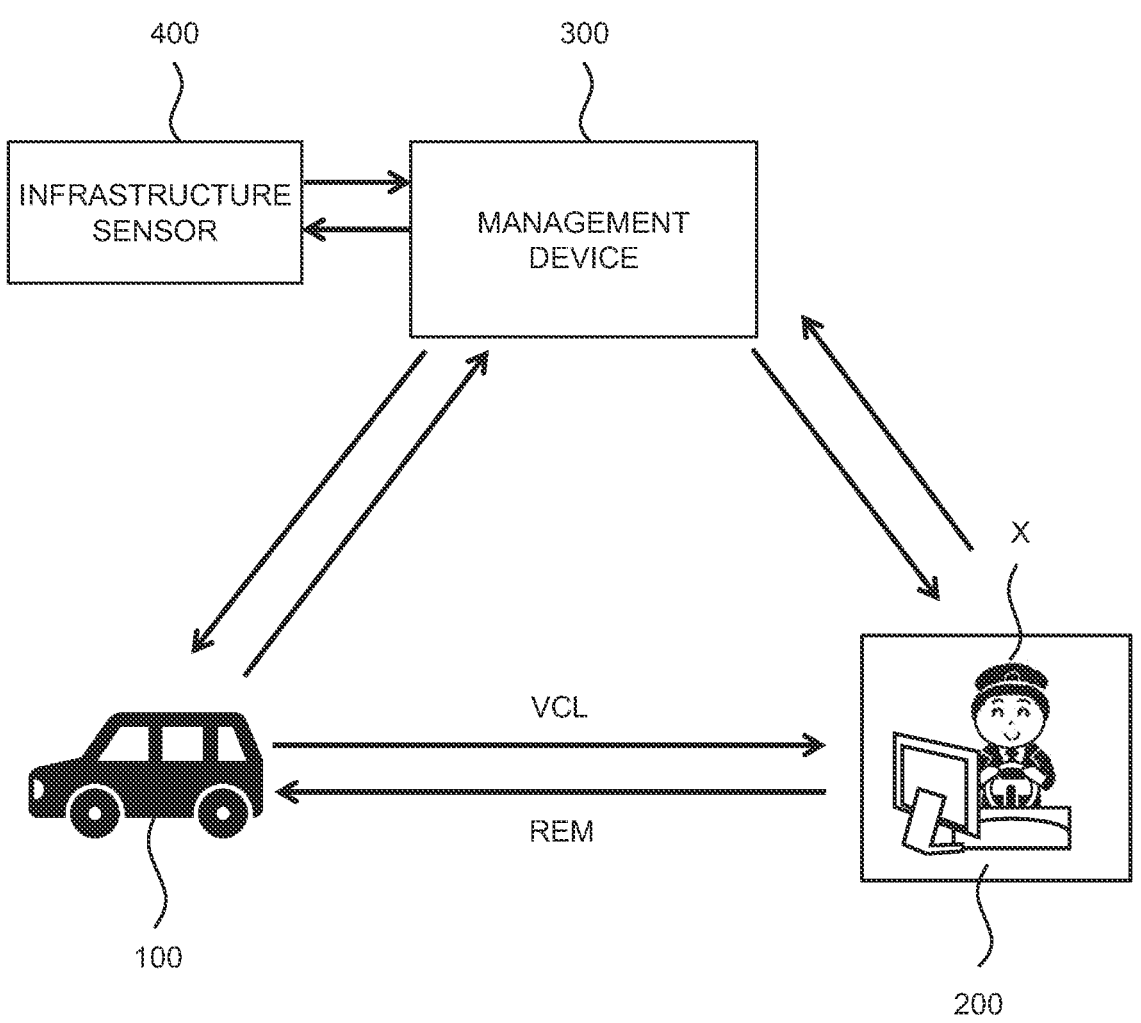
FIG. 1 is a schematic diagram illustrating a configuration example of a remote driving system according to a present embodiment.

FIG. 1 is a schematic diagram illustrating a configuration example of a remote driving system 1 according to the present embodiment. The remote driving system 1 includes a vehicle 100, a remote driving terminal 200, and a management device 300. The vehicle 100, the remote driving terminal 200, and the management device 300 can communicate with each other via a communication network.

The vehicle 100 is a vehicle to be remotely driven by a remote operator X. The vehicle 100 may be an autonomous driving vehicle. The remote driving terminal 200 is a terminal device operated by the remote operator X when the remote operator X performs remote driving of the vehicle 100. The remote driving terminal 200 may be referred to as a remote cockpit. The management device 300 manages the remote driving system 1. Typically, the management device 300 is a management server on a cloud. The management device 300 may be composed of a plurality of servers which performs distributed processes.

In addition, the remote driving system 1 may include an infrastructure sensor 400. The infrastructure sensor 400 includes an infrastructure camera. The infrastructure sensor 400 may further include a rainfall sensor or the like. The infrastructure sensor 400 is installed in an area where the vehicle 100 travels. The infrastructure sensor 400 and the management device 300 can communicate with each other via a communication network. The infrastructure sensor 400 may communicate with the vehicle 100 and the remote driving terminal 200 directly or via the management device 300.

Figure 2:
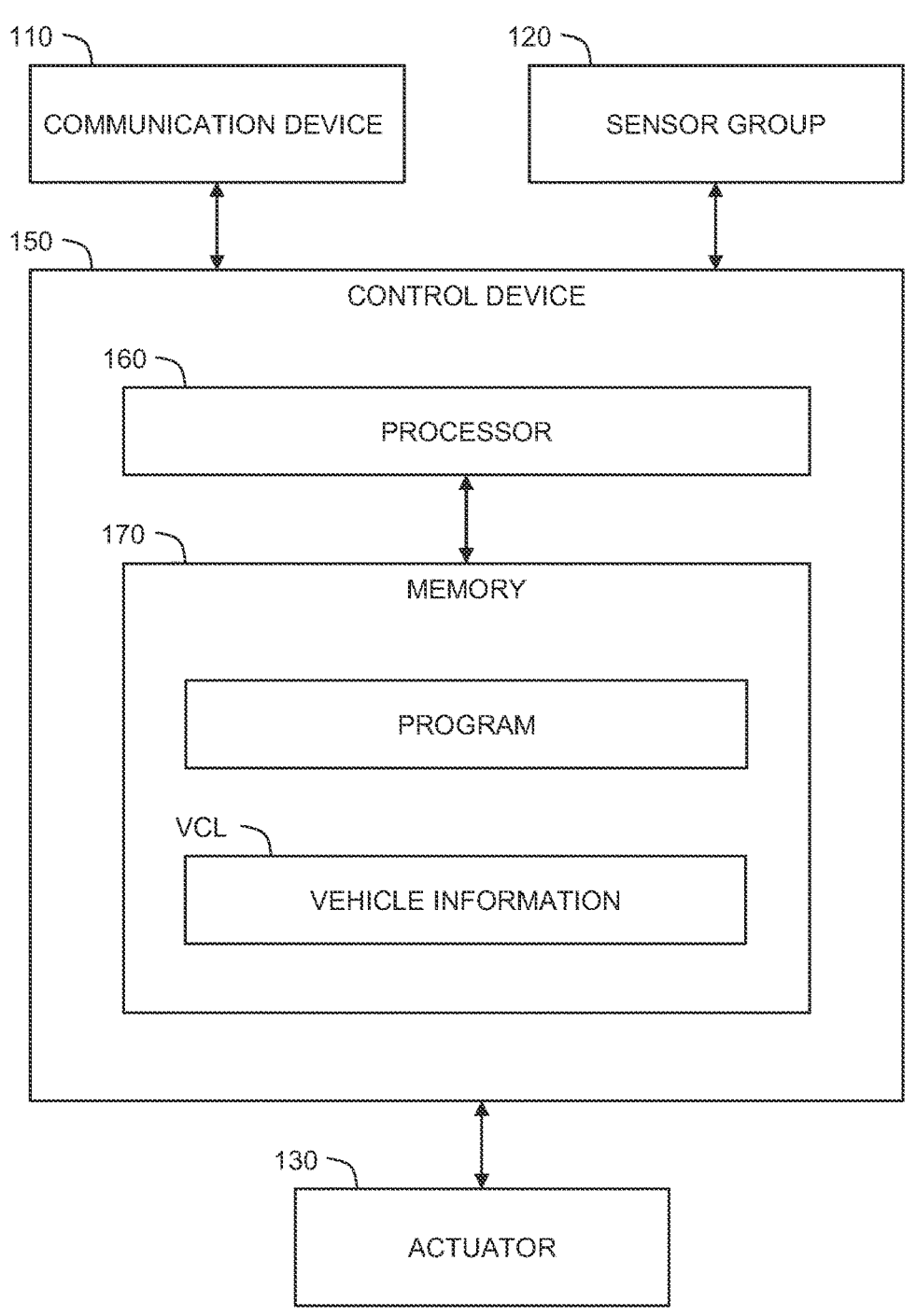
FIG. 2 is a block diagram illustrating a configuration example of a vehicle according to the present embodiment.
Figure 3:
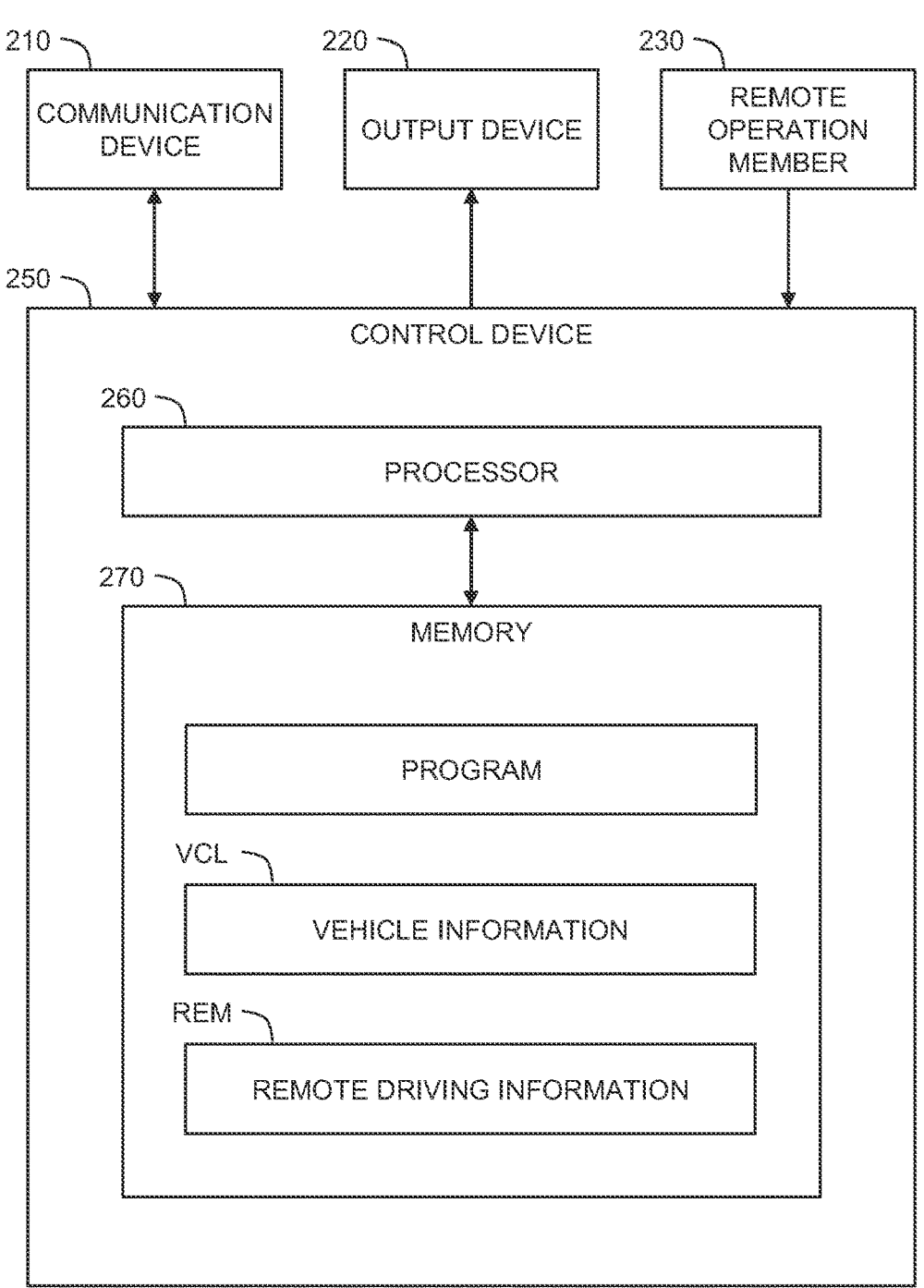
FIG. 3 is a block diagram illustrating a configuration example of a remote driving terminal according to the present embodiment.
Figure 4:
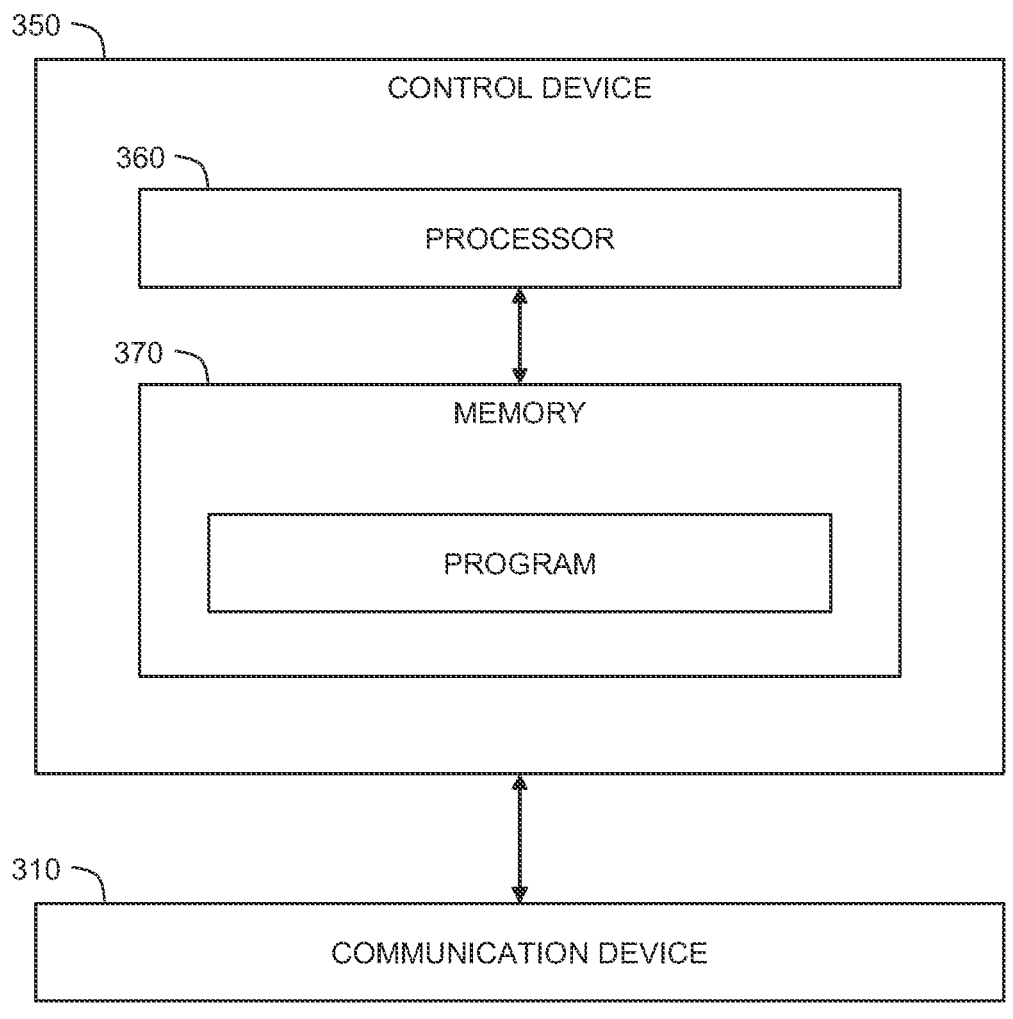
FIG. 4 is a block diagram illustrating a configuration example of a management device according to the present embodiment.

FIGS. 2 to 4 are block diagrams illustrating configuration examples of the vehicle 100, the remote driving terminal 200, and the management device 300, respectively.

FIG. 2 illustrates a configuration example of the vehicle 100. The vehicle 100 includes a communication device 110, a sensor group 120, an actuator 130, and a control device 150. In this example, the vehicle 100 is equipped with an autonomous driving system and can perform autonomous driving.

The communication device 110 communicates with the outside of the vehicle 100. The communication destination of the communication device 110 includes the remote driving terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include an in-vehicle camera, a laser imaging detection and ranging (LIDAR), and a radar. The vehicle state sensor detects a state of the vehicle 100. The vehicle state sensor includes a speed sensor, an acceleration sensor, a yaw rate sensor, a steering angle sensor, a brake hydraulic pressure sensor, and the like. The position sensor detects a position and a direction of the vehicle 100. The position sensor includes, for example, a global navigation satellite system (GNSS) sensor. The sensor group 120 may further include a rainfall sensor.

The actuator 130 includes a steering actuator, a drive actuator, and a brake actuator. The steering actuator steers the wheels. The steering actuator includes, for example, an electric power steering (EPS). The drive actuator is a power source which generates a driving force. Examples of the drive actuator include an engine, an electric motor, and an in-wheel motor. The brake actuator generates a braking force. For example, the brake actuator controls the brake hydraulic pressure to operate the brake.

The control device 150 is a computer which controls the vehicle 100. The control device 150 includes at least one processor (processing circuitry) 160 (hereinafter, simply referred to as a processor 160) and at least one memory 170 (hereinafter, simply referred to as a memory 170). The processor 160 executes various processes. For example, the processor 160 includes a central processing unit (CPU). The memory 170 stores various programs and various kinds of information necessary for processing by the processor 160. By the processor 160 executing the program stored in the memory 170, the function of the control device 150 is realized. Examples of the memory 170 include a volatile memory, a non-volatile memory, a hard disk drive (HDD), and a solid state drive (SSD). The control device 150 may include at least one electronic control unit (ECU).

The control device 150 controls the actuator 130 to control traveling of the vehicle 100. The control device 150 acquires vehicle information VCL from the sensor group 120. The vehicle information VCL includes recognition sensor information showing a result of recognition by the recognition sensor, vehicle state information acquired from the vehicle state sensor, and position information acquired from the position sensor. The recognition sensor information includes an image captured by the in-vehicle camera. The vehicle state information includes speed information, acceleration information, steering angle information, brake hydraulic pressure information, and the like. They are acquired from the speed sensor, the acceleration sensor, the steering angle sensor, the brake hydraulic pressure sensor, and the like. The vehicle information VCL may further include highly accurate position information acquired by localization. The control device 150 can acquire highly accurate position information by performing the localization using map information and the recognition sensor information stored in the memory 170. The vehicle information VCL acquired by the control device 150 can be used for the autonomous driving or the remote driving of the vehicle 100.

For example, the control device 150 controls the autonomous driving of the vehicle 100 based on the vehicle information VCL. More specifically, the control device 150 generates a travel plan of the vehicle 100 based on the vehicle information VCL. Further, the control device 150 generates a target path necessary for the vehicle 100 to travel in accordance with the travel plan based on the vehicle information VCL. The target path is a gathering of target positions of the vehicle 100. The target path may be set to extend along the center of the lane. Then, the control device 150 controls traveling of the vehicle 100 such that the vehicle 100 follows the target path.

The control device 150 can communicate via the communication device 110 and transmit the vehicle information VCL to the remote driving terminal 200 and the management device 300. At least while the remote driving of the vehicle 100 is performed, the vehicle information VCL is transmitted to the remote driving terminal 200. The vehicle information VCL transmitted to the remote driving terminal 200 is referred to by the remote operator X, and the remote driving is performed.

FIG. 3 illustrates a configuration example of the remote driving terminal 200. The remote driving terminal 200 includes a communication device 210, an output device 220, a remote operation member 230, and a control device 250.

The communication device 210 communicates with the vehicle 100 and the management device 300.

The output device 220 outputs various kinds of information and presents the information to the remote operator X. For example, the output device 220 includes a display device. The display device displays various kinds of information to the remote operator X. As another example, the output device 220 may include a speaker.

The remote operation member 230 is a member operated by the remote operator X when the remote operator X remotely drives the vehicle 100. The remote operation member 230 includes, for example, a steering operation member, an accelerator pedal, a brake pedal, a direction indicator, and the like. The steering operation member is, for example, a steering wheel. The remote operation member 230 may include a touch panel, a button, or the like. An operation amount input by the remote operator X during the remote driving of the vehicle 100 is detected by a sensor installed in the remote operation member 230.

The control device 250 controls the remote driving terminal 200. The control device 250 includes at least one processor (processing circuitry) 260 (hereinafter, simply referred to as a processor 260) and at least one memory 270 (hereinafter, simply referred to as a memory 270). The processor 260 executes various processes. For example, the processor 260 includes a CPU. The memory 270 stores various programs and various kinds of information necessary for processing by the processor 260. By the processor 260 executing the program stored in the memory 270, the function of the control device 250 is realized. Examples of the memory 270 include a volatile memory, a non-volatile memory, an HDD, and an SSD.

The control device 250 communicates with the vehicle 100 via the communication device 210. The control device 250 receives the vehicle information VCL transmitted from the vehicle 100. The control device 250 presents the vehicle information VCL to the remote operator X by displaying the vehicle information VCL including the image on the display device. The remote operator X can recognize the state of the vehicle 100, the situation around the vehicle 100, or the like based on the vehicle information VCL displayed on the display device.

In addition, the control device 250 may acquire infrastructure information detected by the infrastructure sensor 400 directly or via the management device 300. The infrastructure information acquired by the control device 250 may include, for example, an image acquired by the infrastructure camera capturing the vehicle 100 and the surroundings thereof. The acquired infrastructure information is displayed on the display device. The remote operator X may recognize the state of the vehicle 100, the situation around the vehicle 100, or the like by referring to the infrastructure information. By presenting the image captured by the infrastructure camera to the remote operator X in addition to the image captured by the in-vehicle camera, accuracy of the remote driving or usability for the remote operator X can be improved.

The control device 250 generates remote driving information REM based on the operation amount input by the remote operator X. The remote driving information REM is information for controlling the vehicle 100 by the remote driving. The remote driving information REM includes the operation amount of the remote operation member 230 input by the remote operator X. The control device 250 transmits the remote driving information REM to the vehicle 100 as necessary.

FIG. 4 illustrates a configuration example of the management device 300. The management device 300 includes a communication device 310 and a control device 350.

The communication device 310 communicates with the vehicle 100, the remote driving terminal 200, and the infrastructure sensor 400.

The control device 350 controls the management device 300. The control device 350 includes at least one processor (processing circuitry) 360 (hereinafter, simply referred to as a processor 360) and at least one memory 370 (hereinafter, simply referred to as a memory 370). The processor 360 executes various processes. For example, the processor 360 includes a CPU. The memory 370 stores various programs and various kinds of information necessary for processing by the processor 360. By the processor 360 executing the program stored in the memory 370, the function of the control device 350 is realized. Examples of the memory 370 include a volatile memory, a non-volatile memory, an HDD, and an SSD.

The control device 350 communicates with the vehicle 100 and the remote driving terminal 200 via the communication device 310. In addition, the control device 350 communicates with the infrastructure sensor 400 via the communication device 310 as necessary to acquire the infrastructure information. The infrastructure information which the control device 350 acquires from the infrastructure sensor 400 includes the image captured by the infrastructure camera.

The control device 350 may manage various kinds of information related to the remote driving of the vehicle 100. For example, the control device 350 may acquire weather forecast information, traffic information of the area where the vehicle 100 travels, or the like and manage these pieces of information. The weather forecast information includes a forecast about future weather in the area where the vehicle 100 will travel. The weather forecast information may include information about current weather in the area where the vehicle 100 travels.

1-2. Remote Driving by Remote Driving System

The remote driving system 1 performs the remote driving of the vehicle 100 based on the operation amount input into the remote driving terminal 200 by the remote operator X. When the remote driving system 1 detects a "first situation", the remote driving of the vehicle 100 is started. The first situation is a situation in which the remote driving of the vehicle 100 is required.

When the remote driving system 1 detects the first situation, the management device 300 assigns a certain remote operator X from among a plurality of candidates to the vehicle 100. The management device 300 manages assignment relationship between the vehicle 100 and the remote operator X and provides information about the assignment relationship to the vehicle 100 and the remote driving terminal 200. The vehicle 100 and the remote driving terminal 200 which have received the information about the assignment relationship establish communication.

While the remote driving is performed, the vehicle 100 and the remote driving terminal 200 transmit and receive information via the communication network. The communication between the vehicle 100 and the remote driving terminal 200 may be performed directly or via the management device 300.

The vehicle 100 transmits the vehicle information VCL to the remote driving terminal 200. The remote driving terminal 200 receives the vehicle information VCL transmitted from the vehicle 100 and presents the vehicle information VCL to the remote operator X. For example, the remote driving terminal 200 presents the vehicle information VCL by displaying the image on the display device of the output device 220. The remote operator X recognizes the situation around the vehicle 100 by viewing the displayed information and performs the remote driving of the vehicle 100 by operating the remote operation member 230.

The control device 250 generates the remote driving information REM based on the operation amount of the remote operation member 230 input by the remote operator X. Then, the control device 250 transmits the remote driving information REM to the vehicle 100 via the communication device 210.

The vehicle 100 receives the remote driving information REM transmitted from the remote driving terminal 200. The vehicle 100 controls traveling of the vehicle in accordance with the received remote driving information REM. In this way, the remote driving of the vehicle 100 is performed.

2. Initial Check

As described above, the remote driving of the vehicle 100 is started by the remote driving system 1 when the first situation is detected. However, the remote driving cannot be always started immediately after the first situation is detected. Before the remote driving is started, an "initial check" needs to be performed for checking that the remote driving can be started. The remote driving system 1 starts the remote driving after checking that the remote driving can be started in accordance with the result of the initial check.

Figure 5:
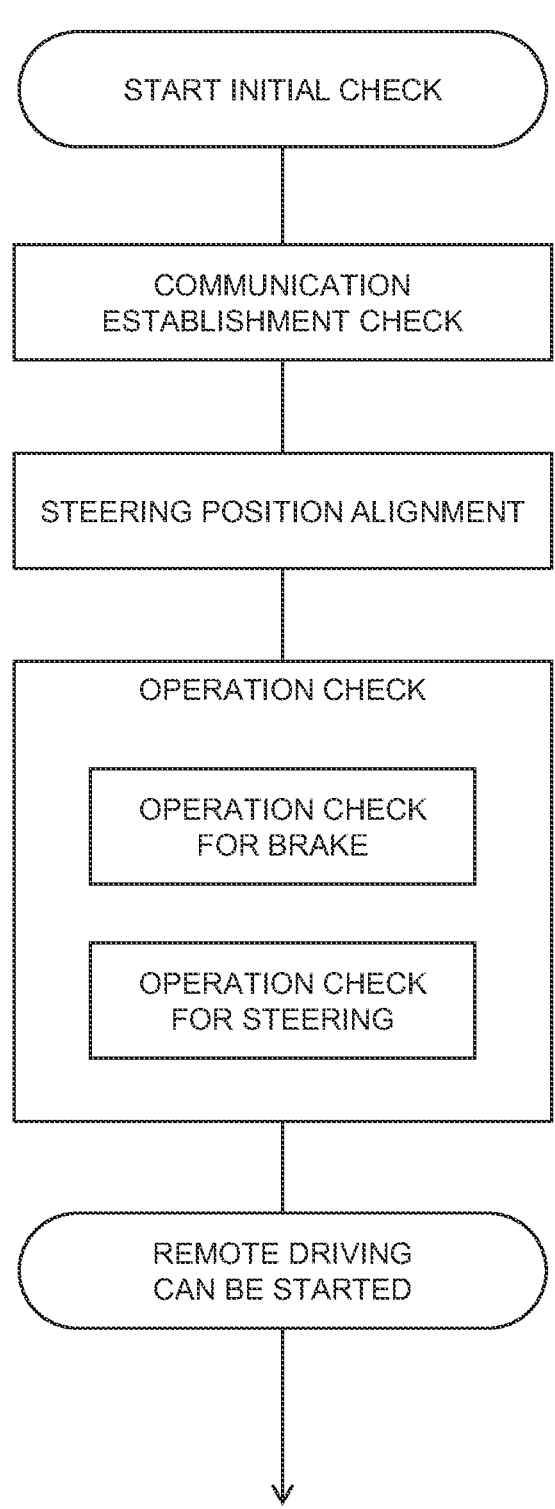
FIG. 5 is a diagram for explaining a specific example of an initial check.

FIG. 5 illustrates a specific example of the initial check. The initial check is performed at the remote driving terminal 200. As illustrated in FIG. 5, the initial check includes several steps.

In the first step of the initial check, "communication establishment check" is performed for checking that communication between the vehicle 100 and the remote driving terminal 200 is normally established. More specifically, in the communication establishment check, it is checked that the vehicle 100 and the remote driving terminal 200 assigned to this vehicle 100 are normally connected to each other and are in a communicable state. For example, the remote driving terminal 200 transmits a test signal for the communication establishment check to the vehicle 100. The test signal may be a ping. Then, when the remote driving terminal 200 normally receives a response signal transmitted from the vehicle 100 in response to the test signal, it is determined that the communication is normally established. When it is determined that the communication is normally established, it means that necessary information can be accurately transmitted and received between the vehicle 100 and the remote driving terminal 200.

By the communication establishment check being completed, it is guaranteed that the remote driving terminal 200 can normally receive the vehicle information VCL from the vehicle 100. The initial check proceeds to the next step, and "steering position alignment" is performed. The steering position alignment means bringing a steering angle of the steering operation member of the remote driving terminal 200 in line with a steering angle of the vehicle 100. The steering angle of the vehicle 100 is a steering angle of a steering wheel of the vehicle 100. Alternatively, the steering angle of the vehicle 100 may be calculated from a steering angle of the wheels of the vehicle 100. Information about the steering angle of the steering wheel or the steering angle of the wheels of the vehicle 100 can be acquired from the vehicle information VCL transmitted from the vehicle 100 to the remote driving terminal 200. The steering angle of the steering operation member of the remote driving terminal 200 is detected by the sensor installed in the steering operation member.

Figure 6:
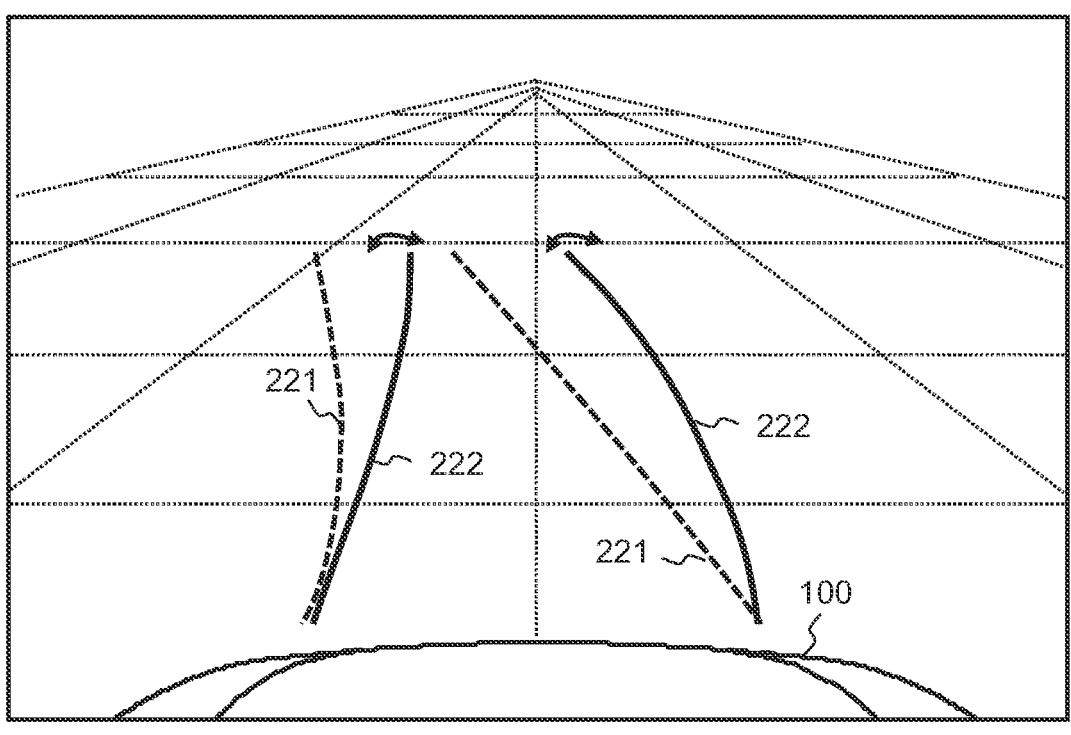
FIG. 6 is a schematic diagram illustrating steering position alignment.

FIG. 6 is a diagram illustrating an example of an image displayed on the display device of the remote driving terminal 200 when the steering position alignment is performed. A traveling trajectory 221, which is shown by dotted lines, represents a traveling trajectory of the vehicle 100 calculated from the current steering angle of the vehicle 100. On the other hand, a traveling trajectory 222, which is shown by solid lines, represents a traveling trajectory of the vehicle 100 calculated from the steering angle of the steering operation member of the remote driving terminal 200. The remote driving terminal 200 draws the traveling trajectories 221 and 222 such that they are superimposed on the image included in the vehicle information VCL. Then, the remote driving terminal 200 displays the image on which the travel trajectories 221 and 222 are superimposed on the display device. The steering position alignment means adjusting the steering angle of the steering operation member such that the two traveling trajectories 221 and 222 come into line with each other. Normally, the steering position alignment is performed by the remote operator X controlling the steering operation member such that the traveling trajectory 221 and the traveling trajectory 222 come into line with each other. Whether the two trajectories are in line with each other may be automatically determined by the remote driving terminal 200 or may be manually determined by the remote operator X. In the case where the determination is made manually, the remote operator X uses a button or the like of the remote operation member 230 to input information indicating that the two trajectories come into contact with each other.

By the steering position alignment being completed, it is ready to reflect the operation amount of the steering operation member in steering of the wheels of the vehicle 100. Thereafter, the remote driving information REM can be transmitted from the remote driving terminal 200 to the vehicle 100.

Reference is made again to FIG. 5. After the steering position alignment is completed and the steering angle of the steering operation member and the steering angle of the wheels correspond to each other, an operation check is performed. The operation check is for checking that the operation amount of the remote operator X transmitted to the vehicle 100 as the remote driving information REM is reflected in the operation of the actuator 130, that is, the actuator 130 operates in response to the operation amount of the remote operator X. The operation check includes an operation check for the brake and an operation check for the steering. Order of performing the operation check for the brake and performing the operation check for the steering is not limited.

The operation check for the brake is for checking that the operation amount of the brake input into the brake pedal of the remote operation member 230 by the remote operator X is reflected in operation of the brake actuator of the vehicle 100. The remote driving terminal 200 transmits a test signal to the vehicle 100 for requesting the brake actuator to operate. For example, the remote driving terminal 200 transmits the remote driving information REM including the operation amount of the brake pedal of the remote operation member 230 (test signal) to the vehicle 100. The brake hydraulic pressure is expected to change normally if the brake actuator operates normally in response to this test signal. Therefore, the remote driving terminal 200 receives the vehicle information VCL from the vehicle 100 and monitors information about the brake hydraulic pressure included in the vehicle information VCL. If the brake hydraulic pressure changes as expected in response to the transmission of the test signal, the remote driving terminal 200 determines that the brake actuator operates normally. If the brake actuator operates normally, the operation check for the brake is finished.

The operation check for the steering is performed for checking that the operation amount input into the steering operation member of the remote operation member 230 by the remote operator X is reflected in operation of the steering actuator and the wheels of the vehicle 100 steers. The remote driving terminal 200 transmits a test signal to the vehicle 100 for requesting the steering actuator to operate. For example, the remote driving terminal 200 transmits the remote driving information REM including the operation amount of the steering operation member of the remote operation member 230 (test signal) to the vehicle 100. The steering angle of the vehicle 100 is expected to change normally if the steering actuator operates normally in response to this test signal. Therefore, the remote driving terminal 200 receives the vehicle information VCL from the vehicle 100 and monitors the steering angle information included in the vehicle information VCL. If the steering angle of the vehicle 100 changes as expected in response to the transmission of the test signal, the remote driving terminal 200 determines that the steering actuator operates normally. If the steering actuator operates normally, the operation check for the steering is finished.

The specific example of the initial check is described above. The remote driving system 1 performs the initial check exemplified in FIG. 5 before starting the remote driving. Then, the remote driving system 1 starts the remote driving after it is checked that the remote driving can be started as a result of the initial check. In other words, the remote driving system 1 cannot start the remote driving until the initial check is completed. Therefore, if it takes a long time from detecting the first situation to finishing the initial check, the time when the remote driving is started becomes late.

However, it is desirable that the time from detecting the first situation to starting the remote driving is short. In particular, in some cases, there is a possibility that the remote driving of the vehicle 100 is required to be started rapidly depending on the state of the vehicle 100. For example, if the vehicle 100 stops in a railroad crossing or the like, the remote driving is required to be started rapidly. In order to start the remote driving rapidly, it is necessary to complete the initial check rapidly.

Thus, the remote driving system 1 according to the present embodiment detects a "second situation". The second situation is a situation showing a sign of the first situation. In other words, the second situation is a situation showing that although the remote driving of the vehicle 100 is not required at the present time, it is likely to be required in the future. When the second situation is detected, the remote driving system 1 performs at least a part of the initial check before the first situation is detected. By performing at least a part of the initial check before the first situation is detected, it is possible to shorten the time from detecting the first situation to finishing the initial check and to start the remote driving early.

Similarly to the first situation, when the remote driving system 1 detects the second situation, the management device 300 assigns a certain remote operator X from among a plurality of candidates to the vehicle 100. The management device 300 manages assignment relationship between the vehicle 100 and the remote operator X and provides information about the assignment relationship to the vehicle 100 and the remote driving terminal 200. The vehicle 100 and the remote driving terminal 200 which have received the information about the assignment relationship establish communication. Thereafter, the remote driving system 1 starts at least a part of the initial check.

3. First Situation and Second Situation

Specific examples of the first situation and the second situation will be described. The first situation and the second situation may be detected by the vehicle 100 or may be detected by the management device 300. Further, the first situation and the second situation may be detected by the same entity, or each may be detected by the different entity.

The first situation may be, for example, a situation in which a remote driving request (Request for Operation, RFO) is transmitted from the vehicle 100 to the management device 300. For example, when the autonomous driving system of the vehicle 100 determines that it is difficult to continue the autonomous driving, the remote driving request is transmitted from the vehicle 100 to the management device 300. The remote driving request may be transmitted from the vehicle 100 while the vehicle 100 is traveling or may be transmitted while the vehicle 100 is stopped.

Alternatively, the remote driving system 1 may detect the first situation based on the infrastructure information acquired from the infrastructure sensor 400. For example, when an abnormal state of the vehicle 100 is detected from the image captured by the infrastructure camera of the infrastructure sensor 400, it is predicted that the vehicle 100 has difficulty in continuing the autonomous driving. For example, the abnormal state of the vehicle 100 is a state in which the vehicle 100 travels with its body deviating from the lane beyond a threshold value. As another example, the abnormal state is a state in which the vehicle 100 is stopped although it should be traveling. The remote driving system 1 may detect the abnormal state of the vehicle 100 like these as the first situation.

The remote driving system 1 may detect the second situation based on the infrastructure information acquired from the infrastructure sensor 400. For example, the second situation may be a situation in which a sign state is detected from the image captured by the infrastructure camera of the infrastructure sensor 400. The sign state is, for example, a state in which the vehicle 100 is meandering. As another example, the sign state may be a state in which a vehicle speed of the vehicle 100 become extremely low. For example, when the vehicle 100 is meandering, a problem may have occurred in the control of the vehicle 100 and thus the remote driving of the vehicle 100 may be required in the future. Therefore, the second situation may be the state like these.

As another example, the remote driving system 1 may detect the first situation and the second situation based on the weather in the area where the vehicle 100 travels. This is an example in a case where the vehicle 100 is the autonomous driving vehicle.

For example, the first situation may be a situation in which the rainfall in the area where the vehicle 100 travels is equal to or greater than a first threshold value. When the rainfall is large, it is difficult for the vehicle 100 to continue the autonomous driving and the remote driving is required. Therefore, the first situation may be the situation like this. The remote driving system 1 can detect such a situation by the rainfall sensor of the infrastructure sensor 400 or the rainfall sensor of the sensor group 120. For example, the remote driving system 1 may detect a situation showing that average rainfall in the area where the vehicle 100 travels is larger than the first threshold value as the first situation.

Further, in this case, the second situation may be a situation in which the rainfall in the area where the vehicle 100 travels is equal to or greater than a second threshold value and less than the first threshold value. The second threshold is smaller than the first threshold value. For example, the remote driving system 1 may detect a situation showing that the average rainfall in the area in which the vehicle 100 travels is larger than the second threshold value as the second situation.

Alternatively, in this case, the second situation may be a situation in which it is forecasted that it will start raining in the area where the vehicle 100 will travel. If such a situation is detected, the rainfall in the area where the vehicle 100 will travel is likely to become equal to or larger than the first threshold value in the future. The remote driving system 1 can acquire information about where the vehicle 100 will travel in the future from the vehicle information VCL. In addition, the forecast about rainfall can be acquired from the weather forecast information. The remote driving system 1 refers to these pieces of information and when it is forecasted that it will start raining in the area where the vehicle 100 will travel, detects this situation as the second situation.

Figure 7:
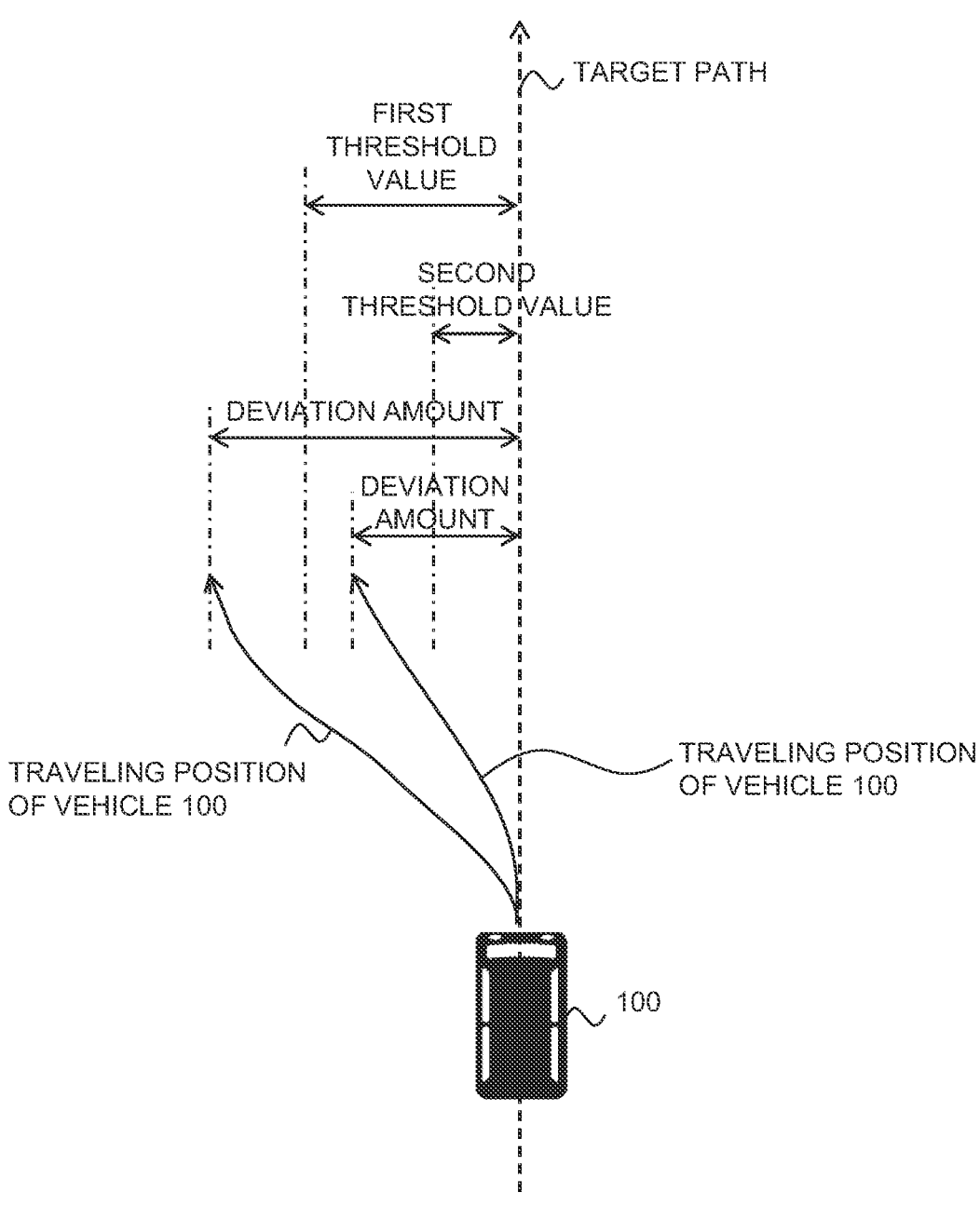
FIG. 7 is a schematic diagram for explaining a first situation and a second situation.

As still another example, the remote driving system 1 may detect the first situation and the second situation based on deviation of the vehicle 100 from the target path while the vehicle 100 is controlled by the autonomous driving. This is also an example in a case where the vehicle 100 is the autonomous driving vehicle. The target path is a path to be followed by the vehicle 100 which is controlled by the autonomous driving. As illustrated in FIG. 7, there is a situation where the traveling position of the vehicle 100 deviates from the target path and a deviation amount becomes larger than a first threshold value. In a situation like this where the vehicle 100 greatly deviates from the target path, it is considered that it is difficult to continue the autonomous driving and it is necessary to start the remote driving of the vehicle 100. Therefore, the remote driving system 1 may detect such a situation as the first situation.

In this case, the remote driving system 1 may detect a situation in which the deviation amount becomes larger than a second threshold value as the second situation. The second threshold value is set to be smaller than the first threshold value. At the time point when the deviation amount becomes larger than the second threshold value, there is a possibility that the autonomous driving system will restore the vehicle 100 to the target path thereafter, and it is not unconditionally necessary to make the remote driving to start at the present time point. However, there is a possibility that the deviation amount will further increase and exceed the first threshold value and the remote driving of the vehicle 100 will be required. Therefore, such a situation may be detected as the second situation.

The deviation amount can also be referred to as a distance between the vehicle 100 and the target path. The remote driving system 1 can calculate the deviation amount by comparing the position of the vehicle 100 with the target path. The remote driving system 1 may acquire the position of the vehicle 100 from the position information of the vehicle 100 obtained from the vehicle information VCL or may acquire the position of the vehicle 100 from the image captured by the infrastructure camera of the infrastructure sensor 400. Information about the target path to be followed by the vehicle 100 can be acquired from the vehicle information VCL.

4. Example of Processing

Processes performed by the remote driving system 1 will be described with reference to FIGS. 8 and 9.

Figure 8:
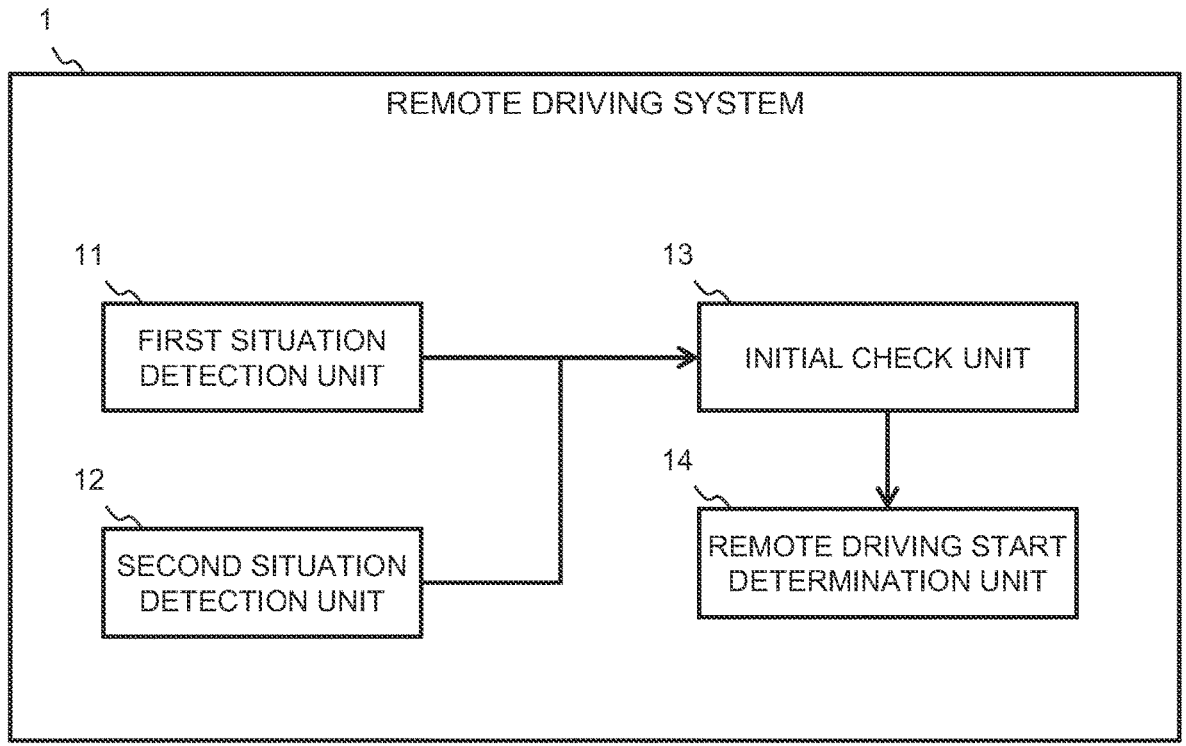
FIG. 8 is a block diagram illustrating an example of a functional configuration of the remote driving system according to the present embodiment.

FIG. 8 is a block diagram illustrating an example of a functional configuration of the remote driving system 1. The remote driving system 1 includes a first situation detection unit 11, a second situation detection unit 12, an initial check unit 13, and a remote driving start determination unit 14 as functional blocks.

The first situation detection unit 11 detects the first situation. The first situation is a situation in which the remote driving of the vehicle 100 is required. A processing entity which realizes the first situation detection unit 11 may be the processor 160 of the vehicle 100 or may be the processor 360 of the management device 300. For example, the processor 160 of the vehicle 100 may detect the first situation based on the information acquired from the sensor group 120. Alternatively, the processor 360 of the management device 300 may detect the first situation based on the information acquired from the infrastructure sensor 400. When detecting the first situation, the first situation detection unit 11 transmits information showing that the first situation is detected to the initial check unit 13.

The second situation detection unit 12 detects a second situation. The processing entity which realizes the second situation detection unit 12 may be the processor 160 or may be the processor 360. For example, the processor 160 of the vehicle 100 may detect the second situation based on the weather forecast information acquired from the management device 300. Alternatively, the processor 360 of the management device 300 may detect the second situation from the information acquired from the infrastructure sensor 400. When detecting the second situation, the second situation detection unit 12 transmits information showing that the second situation is detected to the initial check unit 13.

The initial check unit 13 performs the initial check. The initial check unit 13 is realized by the processor 260 of the remote driving terminal 200. The initial check unit 13 performs the initial check when the first situation is detected based on the information transmitted from the first situation detection unit 11. In addition, based on the information transmitted from the second situation detection unit 12, the initial check unit 13 performs at least a part of the initial check before the first situation is detected in a case where the second situation is detected. When the initial check is finished, the initial check unit 13 transmits the result of the initial check to the remote driving start determination unit 14.

The remote driving start determination unit 14 determines whether to start the remote driving or not. A processing entity which realizes the remote driving start determination unit 14 may be the processor 160, may be the processor 260, or may be the processor 360. Alternatively, the remote driving start determination unit 14 may be realized by cooperation of these processors. The remote driving start determination unit 14 determines whether to start the remote driving or not based on the result of the initial check received from the initial check unit 13 and the information about the first situation received from the first situation detection unit 11. When the first situation is detected and the result of the initial check indicates that the remote driving can be started, the remote driving start determination unit 14 starts the remote driving of the vehicle 100. The remote driving start determination unit 14 does not start the remote driving if the first situation is not detected. That is, even if the initial check is completed before the first situation is detected, the remote driving is started after the first situation is detected.

Figure 9:
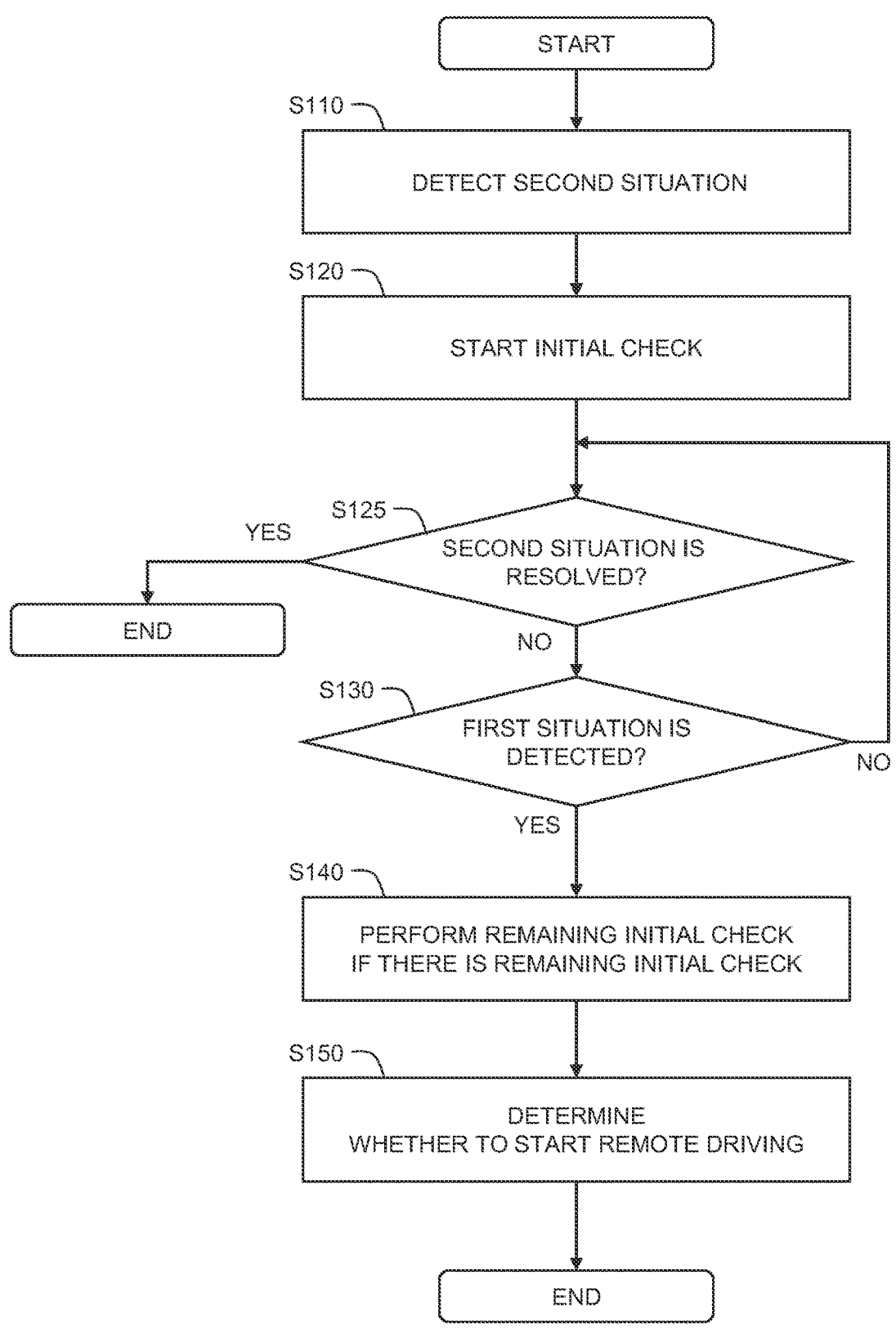
FIG. 9 is a flowchart illustrating an example of processing performed by the remote driving system according to the present embodiment.

FIG. 9 is a flowchart illustrating an example of processing performed by the remote driving system 1 in a case where the second situation is detected.

In Step S110, the remote driving system 1 detects the second situation. The process of Step S110 is executed by the second situation detection unit 12. When the second situation is detected, communication between the vehicle 100 and the remote driving terminal 200 is established. Then, the processing proceeds to Step S120.

In Step S120, the remote driving system 1 starts the initial check. By starting the initial check in advance in Step S120, the remote driving system 1 can perform at least a part of the initial check before the first situation is detected. The process of Step S120 is executed by the initial check unit 13. After the initial check is started and at least a part of the initial check is performed, the processing proceeds to Step S125.

In Step S125, the remote driving system 1 determines whether the second situation is resolved before the first situation is detected or not. In a case where the second situation is resolved before the first situation is detected (Step S125; Yes), the remote driving system 1 terminates the initial check without starting the remote driving. In otherwise case (Step S125; No), the processing proceeds to Step S130.

In Step S130, the remote driving system 1 determines whether the first situation is detected or not. The process of Step S130 is executed by the first situation detection unit 11. If the first situation is detected (Step S130; Yes), the processing proceeds to Step S140. On the other hand, if the first situation is not detected (Step S130; No), the processing returns to Step S125. The initial check is continued during this process.

In Step S140, if there is a remaining initial check, that is, an initial check which is not finished yet, the remote driving system 1 performs it. After the initial check is finished, the processing proceeds to Step S150. The process of Step S140 is executed by the initial check unit 13. Since at least a part of the initial check has already been performed before Step S130, the remote driving system 1 should perform only the remaining initial check in Step S140. Therefore, the time until the process of Step S150 is started becomes shorter than that in a case where all the steps of the initial check are performed in Step S140. The initial check may be finished before Step S130. In this case, Step S140 is skipped and the processing proceeds to Step S150. Since Step S140 is skipped, necessary time until the process of Step S150 is started can be further shortened.

In Step S150, the remote driving system 1 determines whether to start the remote driving or not. The process of Step S150 is executed by the remote driving start determination unit 14. The remote driving system 1 starts the remote driving if the result of the initial check indicates that the remote driving can be started. After the process of Step S150 is performed, the processing ends.

The processing illustrated in the flowchart of FIG. 9 is an example of processing in a case where the second situation is detected. However, in some cases, the remote driving system 1 detects the first situation without detecting the second situation. For example, there is a case where it suddenly starts raining heavily in the area where the vehicle 100 travels although it has not forecasted that it rains according to the weather forecast information. In a case like this, the initial check is performed as usual in response to the detection of the first situation. Then, when it is checked that the remote driving can be started by the initial check, the remote driving is started.

5. Effect

Figure 10:
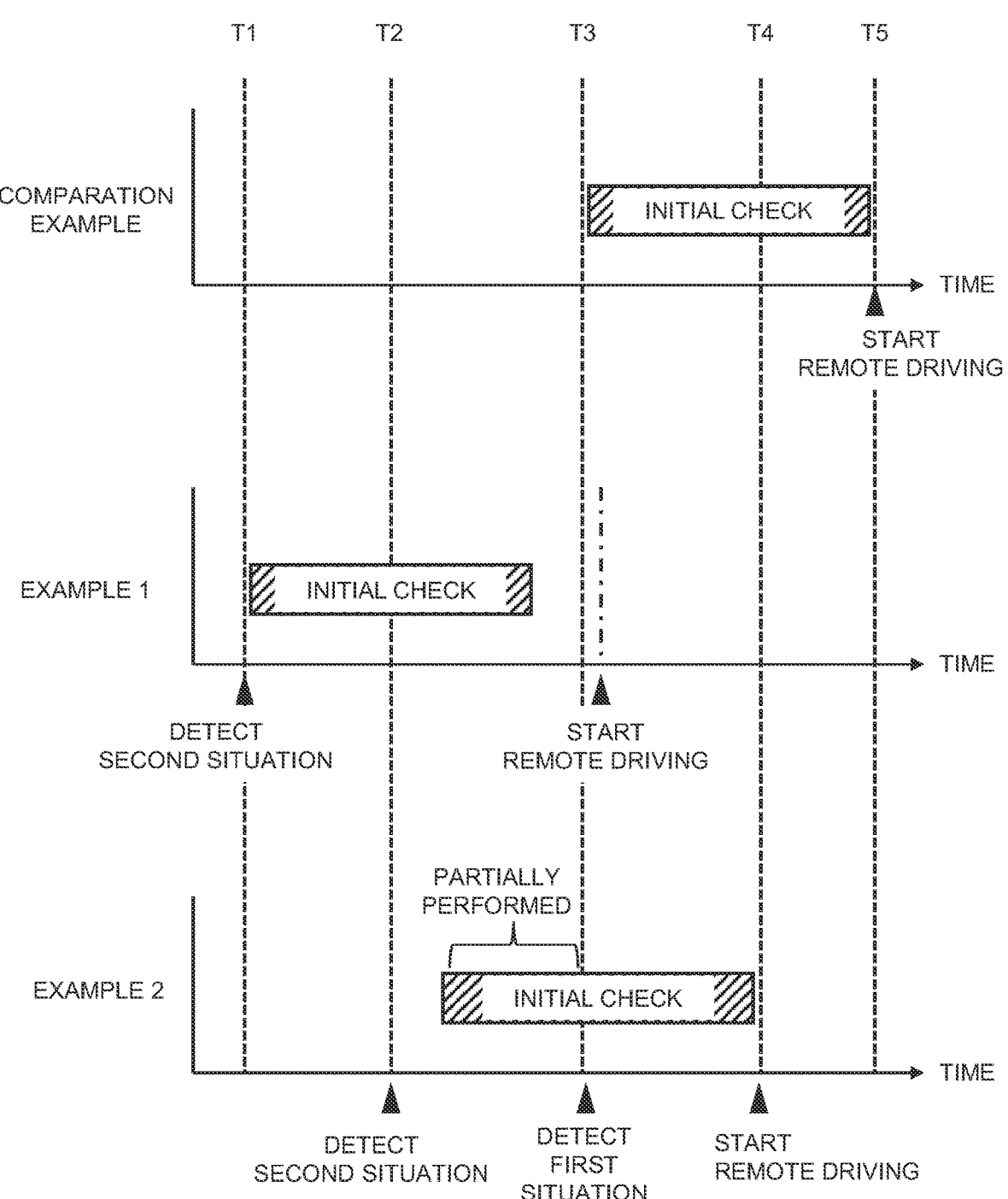
FIG. 10 is a time chart for explaining an effect of processing performed by the remote driving system according to the present embodiment.

FIG. 10 is a time chart for explaining an effect of the processing performed by the remote driving system 1. An upper chart shows a case in a comparative example. An example 1 and an example 2 are examples of cases in which the second situation is detected by the remote driving system 1.

In all of the comparative example, the example 1, and the example 2, the first situation is detected at time T3. In the comparative example, the initial check is started in response to the detection of the first situation. Then, in the comparative example, the remote driving is started at time T5, which is the time when the initial check is finished.

On the other hand, in the example 1, the remote driving system 1 detects the second situation at time T3 before time T1. Then, the remote driving system 1 starts the initial check in response to the detection of the second situation. Therefore, the initial check can be finished before the first situation is detected. Since the initial check is already completed, the remote driving system 1 can start the remote driving immediately after the first situation is detected at time T3.

In the example 2, the second situation is detected at time T2, which is the time after time T1 but before time T3. Similarly to the example 1, the remote driving system 1 starts the initial check in response to the detection of the second situation. Thus, at time T3, which is the time when the first situation is detected, a part of the initial check has already been performed. Since a part of the initial check is already performed, the time from the detection of the first state to the completion of the remaining initial check becomes shorter than the time until the initial check is completed in the comparative example. In this way, the remote driving system 1 can start the remote driving at time T4, which is the time earlier than the time T5.

As described above, according to the remote driving system 1 of the present embodiment, in response to detection of the second situation, at least a part of the initial check is performed before the first situation is detected. Thus, the initial check can be finished early, and the time from when the remote driving is required to when the remote driving is started can be shortened. Thus, the remote driving can be smoothly started.

6. Example of Application

As an example of a scene to which the remote driving system 1 according to the present embodiment is applied, a scene of "autonomous transportation in a factory" is considered.

In the autonomous transportation in the factory, the autonomous driving vehicle autonomously travels in a factory ground. For example, the autonomous driving vehicle assembled in an assembly factory travels from the assembly factory to a yard by autonomously traveling along a predetermined route. One or more infrastructure cameras are installed on a road from the assembly factory to the yard. By using the infrastructure camera, the management device 300 of the remote driving system 1 can remotely monitor the autonomous driving vehicle that is autonomously traveling.

When the vehicle deviates greatly from the target route for some reason and the deviation amount exceeds the first threshold value, it is determined that it is difficult to continue the autonomous driving, and thus the remote driving is started. In a case where a route on which the autonomous driving vehicle travels is determined in advance as in the case of the autonomous transportation in the factory, the management device 300 can detect such a situation based on the information about the route stored in the memory 370 and the image captured by the infrastructure camera. At this time, at least a part of the initial check required for starting the remote driving has already been performed at the time when the deviation amount exceeds the second threshold value. Therefore, the remote driving system 1 can quickly start the remote driving. When the situation in which it is difficult that the autonomous driving vehicle continue to autonomously travel occurs, it is also considered to send a staff to the site and start to drive the vehicle by manual driving, but it takes time and labor. Dealing with the situation by the remote driving is more convenient and reduces time and labor.

7. Modification

A modification will be described. In the modification, a "standby state" is defined as a state of the remote driving terminal 200. Similarly to the above-described embodiment, the remote driving system 1 starts the initial check when the second situation is detected. Then, when the initial check is finished before the first situation is detected and its result indicates that the remote driving can be started, the remote driving system 1 shifts the remote driving terminal 200 to the standby state. The standby state is a state indicating that preparation for the remote driving is completed at the remote driving terminal 200. In other words, the standby state is a state in which the remote driving can be started immediately after the first situation is detected. Further, in the modification, the standby state of the remote driving terminal 200 is terminated under a predetermined condition. Specifically, the remote driving system 1 terminates the standby state in a case where the second situation is resolved and the first situation is not detected.

Figure 11:
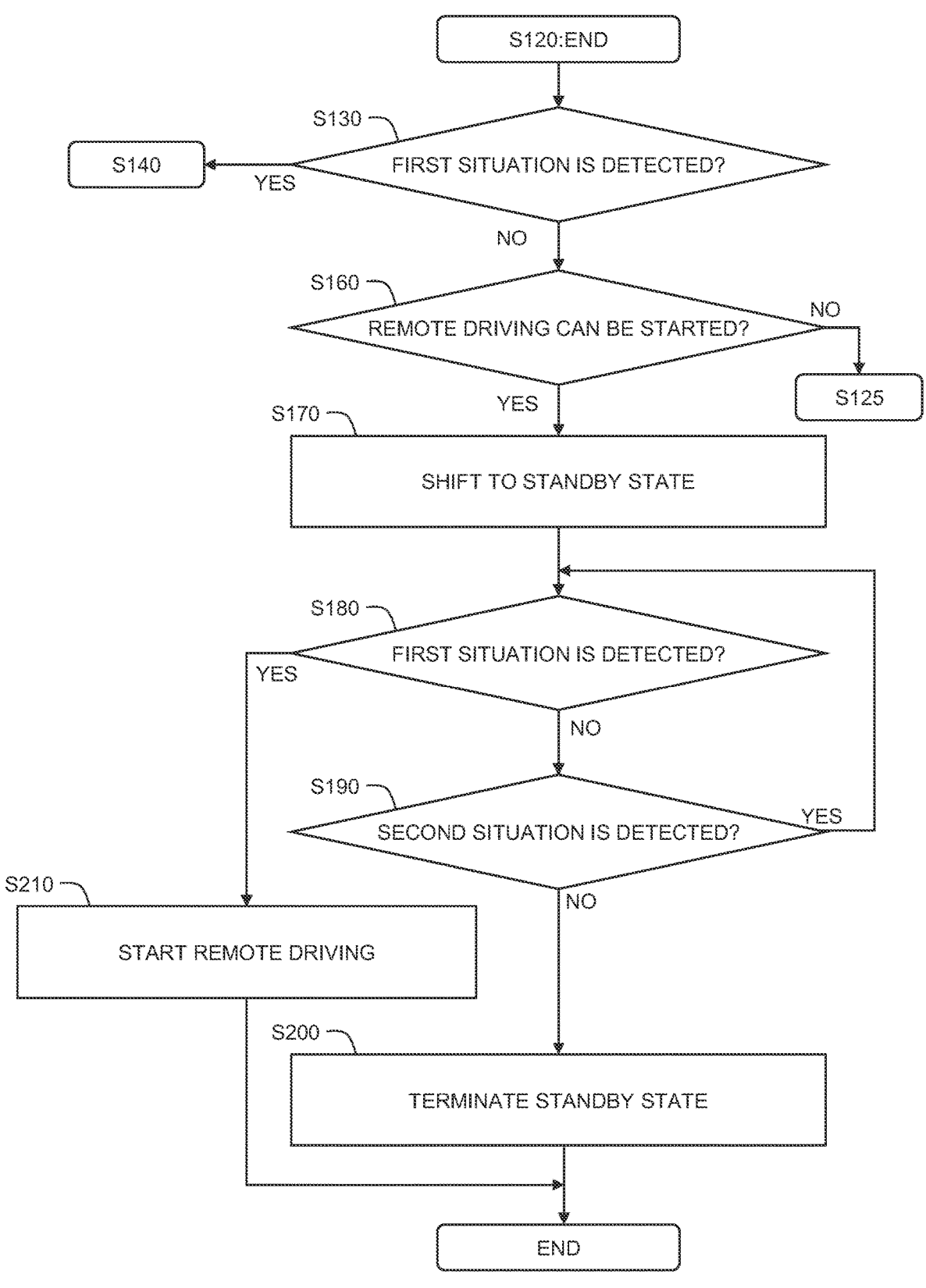
FIG. 11 is a flowchart showing an example of processing in a modification.

FIG. 11 is a flowchart illustrating an example of processing performed by the remote driving system 1 in the modification. In FIG. 11, the same processing as that in FIG. 9 is omitted. Processes before Step S125 is the same as that in the flowchart of FIG. 9.

In Step S130, the remote driving system 1 determines whether the first situation is detected or not. If the first situation is detected (Step S130; Yes), the processing proceeds to Step S140 similarly to FIG. 9. Processes after Step S140 is the same as that in FIG. 9. On the other hand, if the first situation is not detected (Step S130; No), the processing proceeds to Step S160.

In Step S160, the remote driving system 1 determines whether the remote driving can be started or not based on the result of the initial check. If the result of the initial check indicates that the remote driving can be started (Step S160; Yes), the processing proceeds to Step S170. On the other hand, if the result of the initial check does not indicate that the remote driving can be started or if the initial check is not completed (Step S160; No), the processing returns to Step S125. The initial check is continued during this process.

In Step S170, the remote driving system 1 shifts the remote driving terminals 200 to the standby state. The standby state is a state indicating that preparation for the remote driving is completed. After the remote driving device 200 is shifted to the standby state, the processing proceeds to Step S180.

In Step S180, the remote driving system 1 determines whether the first situation is detected or not. If the first situation is detected (Step S180; Yes), the processing proceeds to Step S210. On the other hand, if the first situation is not detected (Step S180; No), the processing proceeds to Step S190.

In Step S210, the remote driving system 1 starts the remote driving of the vehicle 100. In Step S210, since the remote driving terminal 200 is in the standby state, the remote driving system 1 can immediately start the remote driving without loss of time due to the initial check.

In Step S190, the remote driving system 1 determines whether the second situation is still detected or not. If the second situation is still detected (Step S190; Yes), the processing returns to Step S180. On the other hand, if the second situation becomes not detected (Step S190; No), the processing proceeds to Step S200.

In Step S200, the remote driving system 1 terminates the standby state of the remote driving terminals 200. After the standby state of the remote driving terminal 200 is terminated, the processing ends.

In a case where the second situation is detected, the first situation is not necessarily detected thereafter. For example, even if the deviation amount of the vehicle 100 from the target path exceeds the second threshold value, there is a possibility that the vehicle 100 thereafter returns to the target path normally if it is caused by a temporary disturbance of control or the like. In this case, the remote driving of the vehicle 100 becomes not required. Therefore, in the modification, in a case where the first situation is not detected and the second situation is resolved, the standby state of the remote driving terminal 200 is terminated without starting the remote driving of the vehicle 100. This makes it possible to reduce a processing load of the remote driving system 1 due to the remote driving terminal 200 being kept on standby even when the remote driving becomes not necessary. Further, it is possible to prevent the remote driving terminal 200 from continuing to hold the old result of the initial check.

What is claimed is:

1. A remote driving system that performs remote driving of a vehicle based on an operation amount input into a remote driving terminal, the remote driving system comprising:

at least one processor; and at least one memory including computer program, where the at least one memory and the computer program are configured, with the at least one processor, to cause the remote driving system to at least:

detect a second situation showing a sign of a first situation in which the remote driving of the vehicle is required;

perform at least a part of an initial check for checking that the remote driving can be started at the remote driving terminal before the first situation is detected in a case where the second situation is detected; and start the remote driving in a case where the first situation is detected, wherein the initial check at the remote driving terminal includes at least checking communication establishment with the vehicle, and wherein the initial check at the remote driving terminal further includes steering position alignment between the vehicle and the remote driving terminal, and checking that an actuator of the vehicle operates in response to the operation amount transmitted to the vehicle.

2. The remote driving system according to claim 1, wherein the at least one memory and the computer program are further configured to cause the remote driving system to refrain from starting the remote driving in a case where the second situation is resolved before the first situation is detected.

3. The remote driving system according to claim 1, wherein the at least one memory and the computer program are further configured to cause the remote driving system to:

shift the remote driving terminal to a standby state indicating that preparation for the remote driving is completed when a result of the initial check indicates that the remote driving can be started; and terminate the standby state without starting the remote driving in a case where the second state is resolved after the initial check and the first state is not detected.

4. The remote driving system according to claim 1, wherein the at least one memory and the computer program are further configured to cause the remote driving system to:

acquire infrastructure information including an image captured by an infrastructure camera installed in an area where the vehicle travels; and detect the second situation based on the infrastructure information.

5. The remote driving system according to claim 4, wherein the at least one memory and the computer program are further configured to cause the remote driving system to detect the first situation when the vehicle transmits a request to start the remote driving.

6. The remote driving system according to claim 1, wherein the vehicle is an autonomous driving vehicle that can be controlled by autonomous driving, the at least one memory and the computer program are further configured to cause the remote driving system to acquire weather forecast information including a forecast about weather, the first situation is a situation in which rainfall in a place where the vehicle travels is equal to or greater than a threshold value, and the second situation is a situation in which it is forecasted that it will start raining in the place where the vehicle travels according to the weather forecast information.

7. A remote driving system that performs remote driving of a vehicle based on an operation amount input into a remote driving terminal, the remote driving system comprising:

at least one processor; and at least one memory including computer program, where the at least one memory and the computer program are configured, with the at least one processor, to cause the remote driving system to at least:

detect a second situation showing a sign of a first situation in which the remote driving of the vehicle is required;

perform at least a part of an initial check for checking that the remote driving can be started at the remote driving terminal before the first situation is detected in a case where the second situation is detected; and start the remote driving in a case where the first situation is detected, wherein the vehicle is an autonomous driving vehicle that can be controlled by autonomous driving, the at least one memory and the computer program are further configured to cause the remote driving system to acquire a deviation amount of the vehicle from a target path, the first situation is a situation in which the deviation amount exceeds a first threshold value, the second situation is a situation in which the deviation amount exceeds a second threshold value, and the first threshold value is larger than the second threshold value.

8. A remote driving system that performs remote driving of a vehicle based on an operation amount input into a remote driving terminal, the remote driving system comprising:

at least one processor; and at least one memory including computer program, where the at least one memory and the computer program are configured, with the at least one processor, to cause the remote driving system to at least:

detect a second situation showing a sign of a first situation in which the remote driving of the vehicle is required;

perform at least a part of an initial check for checking that the remote driving can be started at the remote driving terminal before the first situation is detected in a case where the second situation is detected; and start the remote driving in a case where the first situation is detected, wherein the vehicle is an autonomous driving vehicle that can be controlled by autonomous driving, the at least one memory and the computer program are further configured to cause the remote driving system to acquire information about rainfall in a place where the vehicle travels, the first situation is a situation in which the rainfall is equal to or greater than a first threshold value, and the second situation is a situation in which the rainfall is equal to or greater than a second threshold value and less than the first threshold value.

* * * * *